March 31, 1925.  1,532,093
W. E. A. PIPHER
SKID CHAIN FOR AUTOS
Filed Jan. 6, 1925
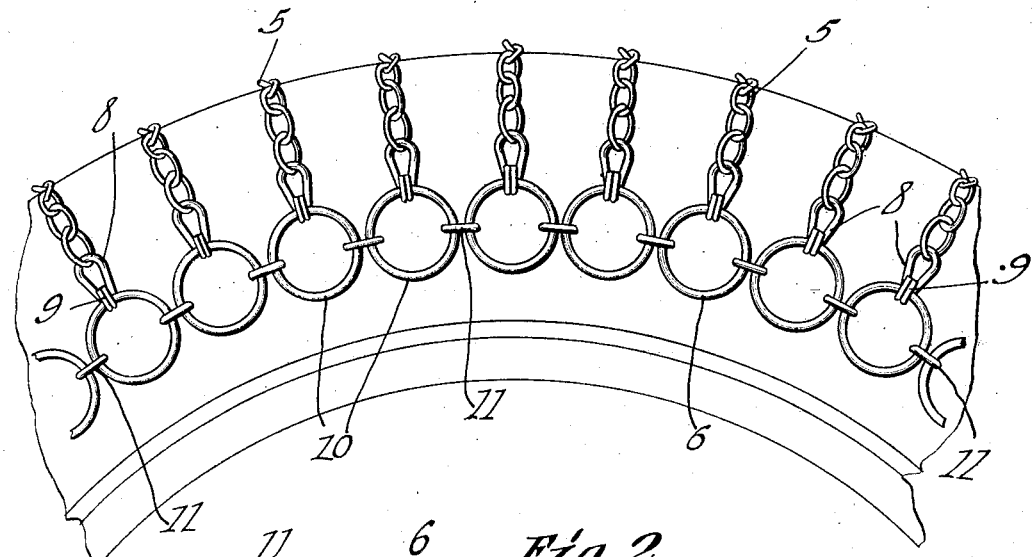
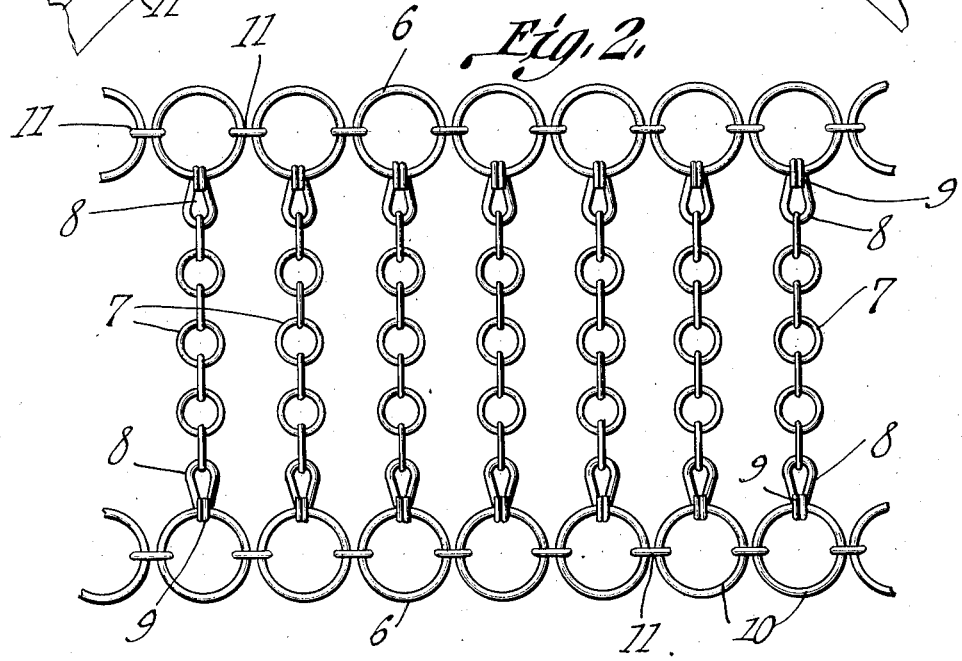
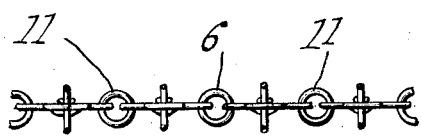
Inventor
W. E. A. Pipher
By C. A. Snow & Co
Attorneys.

Patented Mar. 31, 1925.

1,532,093

UNITED STATES PATENT OFFICE.

WILLIAM E. A. PIPHER, OF PARKERS LANDING, PENNSYLVANIA.

SKID CHAIN FOR AUTOS.

Application filed January 6, 1925. Serial No. 857.

*To all whom it may concern:*

Be it known that I, WILLIAM E. A. PIPHER, a citizen of the United States, residing at Parkers Landing, in the county of Armstrong and State of Pennsylvania, have invented a new and useful Skid Chain for Autos, of which the following is a specification.

This invention relates to anti-skid chain construction, and aims to provide a chain of a novel construction which will present smooth surfaces at its point of engagement with a tire to the end that wear on the tire by the movements of the chain thereover, will be reduced to the minimum.

An important object of the invention is to provide a chain made up of circular links connected in such a way that the links may move to change the points of connection between adjacent links, reducing the wear between the links and increasing the life of the chain.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating a chain constructed in accordance with the invention as mounted on a tire.

Figure 2 is a fragmental elevational view of an anti-skid chain constructed in accordance with the invention.

Figure 3 is a transverse sectional view through the chain.

Referring to the drawing in detail, the chain includes tread sections 5 and supporting sections 6, the tread sections 5 being formed of circular links 7 interlocked as clearly shown by the drawing.

Elongated link members 8 are provided at the ends of the tread sections and are formed with end portions 9 that are positioned over the circular links 10 of the supporting chain sections.

Circular links 11 connect the circular links 10 to hold the links 10 in proper spaced relation with each other. Thus it will be seen that due to this construction, the link members 10 may move with respect to the link members 8 and 11 to the end that the link members 8 and 11 will contact with the links 10 at various points, thereby preventing wear on the links 10 at any one point and consequently increasing the life of the chain.

It will also be seen that due to the connection between the link members or rings constituting the tread sections of the chain, the rings will be constantly moving while in use and wear reduced to the minimum.

I claim:—

1. An anti-skid chain for vehicle wheels, including tread sections and supporting sections, the tread sections comprising a plurality of circular links interlocked to provide chains, said supporting sections including a plurality of circular links, said tread sections having connection with the supporting sections, and circular links for connecting the links of the supporting sections.

2. An anti-skid chain for vehicle wheels, comprising supporting sections and tread sections, said sections comprising chains formed of circular links, and elongated link members at the ends of the tread sections for connecting the tread sections to the supporting sections.

3. An anti-skid chain for vehicle wheels, including tread sections and supporting sections, said tread sections having connection with the supporting sections and including a plurality of ring members, said supporting sections comprising a plurality of relatively large ring members, and ring members for connecting the relatively large ring members of the supporting sections.

In testimony that I claim the foregoing as my own, I have hereto affixed my signature in the presence of two witnesses.

WILLIAM E. A. PIPHER.

Witnesses:
 CLARENCE E. DEAROLPH,
 JOHN H. SWEET.